W. RALPH.
Cheese Curd Cutter.
No. 80,089.            Patented July 21, 1868.
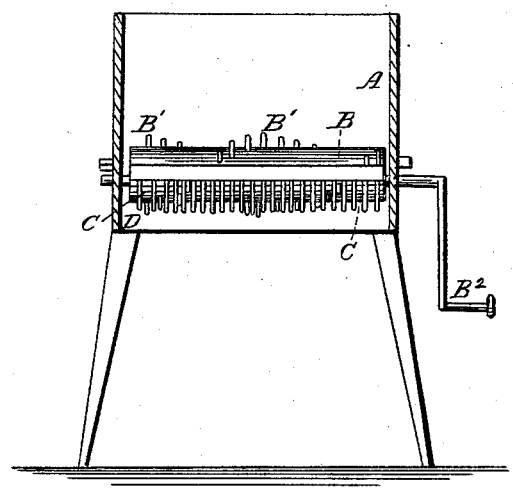
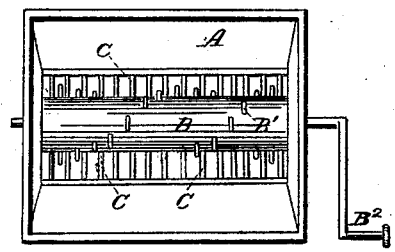
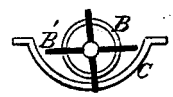
Witnesses:
Arthur M. Beatly
John G. Crocker
Inventor:
Wm Ralph

United States Patent Office.

WILLIAM RALPH, OF UTICA, NEW YORK.

Letters Patent No. 80,089, dated July 21, 1868.

IMPROVED CURD-MILL.

The Schedule referred to in these Letters Patent and making part of the same.

TO ALL WHOM IT MAY CONCERN:

Be it known that I, WILLIAM RALPH, of Utica, Oneida county, New York, have invented a new and useful Improvement in Curd-Mills; and I do hereby declare that the following is a full, clear, and exact description of my said invention, and of the mode of operation of the same, reference being had to the annexed drawing, making a part of this specification, in which—

Figure 1 represents a side view of the mill,
Figure 2 a top view, and
Figure 3 an end view of the cylinder and rack.
A is the hopper.
B is the cylinder.
$B^1$, the spikes therein.
$B^2$, the crank.
C, the rack.
D, the frame.

The main features of my improvement are in forming the cylinder as well as the rack of metal, by means of which the parts may easily be kept clean and sweet at all times, as is absolutely essential; and secondly, in so arranging the ribs of the rack around and under the cylinder, that the curd must necessarily be forced between the ribs without grinding or reducing it to a paste, as is the case with the mills in use, while the ribs on the back side, curved upward as they are, serve to remove any curd that may have adhered to the spikes.

The machine has a frame, D, raised on legs to a suitable height for operating. Near the top of the frame, having its axis resting in bearings therein, is the cylinder B. This cylinder is formed of tin, galvanized iron, or other suitable sheet metal, and, to give the requisite stiffness to it, the spikes $B^1$ are run through and through and soldered to the cylinder, so that each wire forms two spikes.

Resting on the frame is the rack C. It is composed of a series of ribs, in the form of segments of a circle of greater radius than the cylinder B, and which are so arranged, with reference to the said cylinder, that while the space between the cylinder and the ribs at the top of the rack is equal to the length of the spikes $B^1$, the ribs very nearly touch the cylinder at its under side. The ribs and spikes may be formed of tinned wire or the like.

Over the cylinder is placed a hopper, A.

The operation is as follows: The curd is thrown into the hopper, and the cylinder rotated by the crank $B^2$. The spikes, which may be placed in a spiral form around the cylinder, so as to pass between the ribs, press the curd down under the cylinder, while the cylinder itself forces it through the ribs, and the spikes, as they rise on the opposite side, have any adhering curd removed from them by the ribs.

The advantages of a mill so constructed are, that it is made light and cheap, but principally that the metal of which the cylinder, spikes, and rack are formed is capable of being kept clean and sweet readily, which those formed of wood are not; and second, that the curd is readily passed through the ribs, and properly separated, without being cut or ground, or worked into a paste, as with the mills hitherto in use.

Having thus described my invention, what I claim therein as new, and desire to secure by Letters Patent, is—

The box A, cylinder B, armed with teeth, as described, and semicircular grate-bars C, so arranged as to form the bottom of the box A, all in combination, as specified.

WM. RALPH.

Witnesses:
ARTHUR M. BEARDSLEY,
JOHN G. CROCKER.